March 11, 1969  C. C. CLEVELAND  3,432,360
WATERPROOFED ELECTROLYTE ENTRY PORT AND FILL
CHANNEL FOR GALVANIC BATTERY
Filed June 21, 1961

INVENTOR.
CLARK C. CLEVELAND
BY
ATTYS.

United States Patent Office

3,432,360
Patented Mar. 11, 1969

3,432,360
WATERPROOFED ELECTROLYTE ENTRY PORT
AND FILL CHANNEL FOR GALVANIC BATTERY
Clark C. Cleveland, Bennington, Vt., assignor, by mesne
assignments, to the United States of America as represented by the Secretary of the Navy
Filed June 21, 1961, Ser. No. 119,257
U.S. Cl. 136—90                                    4 Claims
Int. Cl. H01m 17/06

This invention relates generally to an improved electrochemical battery and more particularly to the treatment of the electrolyte entry ports and fill channel of a reserve energizer of the force-filled type, utilized as a power source for a proximity fuze or other electrical equipment contained within a spinning projectile.

In the field of reserve energizers it has been the general practice to arrange the cells about a cavity in which is carried an electrolyte containing ampule. An entry port to each cell cavity opens along a fill channel within the ampule containing cavity. When the projectile is fired, the ampule is displaced from its supporting means and forced against a platform breaker with sufficient force to break the ampule and release the electrolyte therefrom. As the projectile leaves the muzzle of the gun, the electrolyte flows along the fill channel due to the decelerating forces acting thereon. The spin forces of the projectile force the electrolyte through the entry port of the individual cells, thereby filling each cell in turn.

During the fraction of a second required for the electrolyte to pass from the fill channel into the individual cells by way of their entry ports, the series connected unit cells are subjected to a short circuit through the flooding electrolyte. Upon completion of the cell filling and subsequent retraction of the electrolyte from the cell entry port by the fill channel separators, some residual wetting of the electrode plate at the fill channel may be apparent. Retention of the acid electrolyte at this edge results in generation of voltage transients of sufficient magnitude to render the battery inoperable with respect to its end uses.

The general purpose of this invention is to provide an electrochemical battery or reserve energizer for use in a spinning projectile which overcomes the aforedescribed disadvantages.

To attain this improvement, the present invention contemplates spraying the interior of the stack and the plate scallop areas at the fill channel with a vinyl lacquer. Through close control of the vinyl lacquer viscosity, the spray gun settings, and spray duration, it is possible to deposit an extremely thin film of lacquer over the cut edge of the plate.

An object of the invention is to provide an improved electrochemical battery or reserve energizer for use as a power source in a proximity fuzing system or other electrical equipment contained within a spinning projectile.

Another object is to provide a force-filled reserve energizer having reduced voltage transients during the fill time of the energizer.

A further object of the invention is to provide a battery or reserve energizer having no voltage transients of sufficient magnitude to render the battery inoperable due to residual wetting of the electrode plate scallops after the filling operation is complete.

Still another object of the invention is to provide waterproofing of the corners of the paper separators adjacent the entry port fill scallop of a force filled electrochemical battery.

Yet another object of the invention is to provide a new and improved adhesive for bonding of the stack liner to the inside of the cell stack.

Other objects and many of the attendant advantages of this invention will be more readily apparent as the same becomes better understood by reference to the following detailed description when considered in connection with the accompanying drawings in which like numerals designate like parts throughout the figures thereof and wherein.

Figure 1:
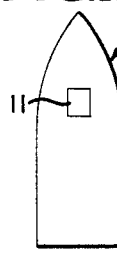
FIG. 1 illustrates a projectile in flight containing a reserve energizer employing the present invention.

There is illustrated in FIG. 1 a projectile, generally indicated by the numeral 12, within which is contained an electrochemical battery or reserve energizer 11 of cylindrical configuration, the axis of which is coincident with the spin axis of the projectile. It is to be understood that the elevational angle of flight of the projectile may be at any angle to the horizon and that the spin of the projectile may be in either direction.

Also within the projectile, but not shown, is a proximity fuzing system or any other electrical equipment requiring a suitable source of the type herein disclosed.

Figure 2:
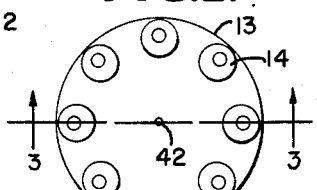
FIG. 2 is a plan view of a preferred embodiment of the invention.

FIG. 2 illustrates a plan view of the reserve energizer and comprises battery casing 13 which is castellated to form a plurality of terminal means 14 to provide for suitable connections to the electrical equipment contained within the projectile. The connector means may be of any suitable type, such as plug-in type connectors.

Figure 3:
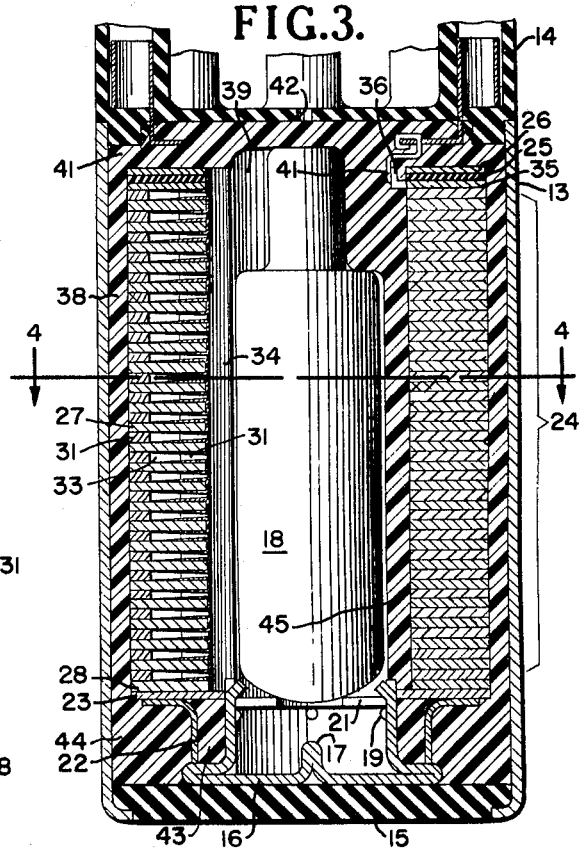
FIG. 3 is a section of the device taken along line 3—3 of FIG. 2.

The section of FIG. 3 is taken along line 3—3 of FIG. 2 and illustrates the battery or reserve energizer in greater detail.

There is illustrated in FIG. 3 a battery case 13 and a base member 15 composed of any suitable molding compound. A breaker platform 16 is supported by the base member 15 and has an impression 17 therein for insuring complete fragmentation of the electrolyte containing ampule 18 as will hereinafter become more readily understood as the description proceeds.

Breaker platform 16 also has a plurality of friction contacts 19 which project slightly inwardly therefrom and hold an ampule supporting disk 21 or any other suitable supporting means in position above the surface of the platform. Friction contacts 19 and the ampule support disk 21 are so arranged that the frictional force therebetween are sufficient to maintain the ampule supported above the breaker platform during normal handling and shipping of the device but insufficient to support the ampule under the set-back forces which occur on firing of the projectile from a gun.

Abutting the breaker platform 16 is a stacked support 22 having a cell support disk 23 thereon. The breaker platform 16, the cell support 22, and the cell support disk 23 are each constructed of steel or other suitable electrical conducting material and may be plated with silver, cadmium, copper, or the like, to insure good electrical contact therebetween for reasons which will hereinafter become more clearly apparent.

Supported by the cell support disk 23 are a plurality of cells 24 which may be either series or parallel connected, and may be of any number depending upon the desired voltage. It is to be understood that the cells may be divided into groups of series connected or parallel connected cells in order to provide the various voltages required of a proximity fuze or other electrical equipment contained within the projectile.

Adjacent the upper cell, as viewed in FIG. 3, is an insulating washer 25 composed of "Vinylite" or other suitable insulating material and a stacked height adjusting device 26 such as a steel washer which can be fabricated to any desired thickness. The height adjusting device may, of course, be omitted or may comprise a plurality of washers, as the case may be, in order to obtain the desired stack height.

The battery 11 utilizes annular shaped plates 27, of electrically conducting material, stacked at a right angle to the unit axis. The first plate 28 is coated with a nickel surface on the side abutting the cell support disk 23 and a lead dioxide coating on the other surface thereof.

If the cells are to be series connected, each of the annular shaped plates 27 will be coated with lead on one surface thereof and with lead dioxide on the other surface. Plates 27 are stacked in such a manner as to place the lead coated surface of one plate facing the lead dioxide coating of the next adjacent plate.

If, however, the cells are to be parallel connected, alternate plates will be connected together and coated over both surfaces with lead and intermediate plates will be connected together and coated over both surfaces with lead dioxide.

Figure 4:
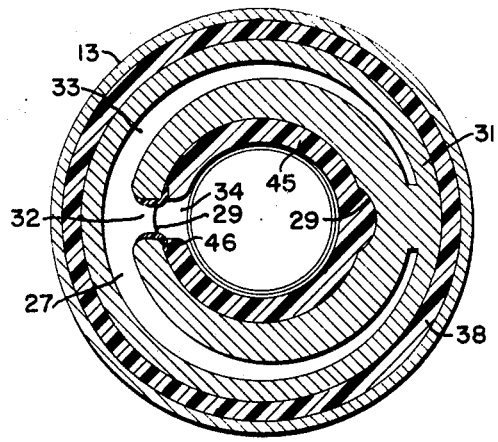
FIG. 4 is a section of the preferred embodiment taken along line 4—4 of FIG. 3 looking in the direction of the arrows.

The annular shaped plates 27 have a pair of diametrically spaced scallops 29 along the inner diameter thereof, as best seen in FIG. 4. Interposed between each pair of plates 27 is a paper separator 31 having an entry port 32 and a cell channel 33 formed therein. The entry port 32 of each paper separator 31 is registered with the scallop 29 of each of the plates 27, such that, in the cell stack unit, the aforesaid plate scallops 29 and the open segment through the separator 31 are aligned to form a fill channel 34, which opens through the separator entry port 32 into each individual cell. The last annular shaped plate 35 which comprises the upper end of the cell stack is formed with a connecting tab 36 disposed in the scallop opposite the fill channel. The tab 36 is, after assembly of the stack, bent at a right angle to provide for connection to the appropriate terminal means 14 as by wire 37.

A connection may be made to the stack support 22 or the breaker platform 16, as the case may be, by any suitable means, not shown, to provide for the other battery terminal. It should be also understood that, if desired, any numbre of voltage taps may be taken along the cell stacked in like manner as described.

In the construction of the battery or reserve energizer 11 the cell stack is assembled as hereinbefore set forth and an outside molding compound 38 applied thereto. The cell stack is then sprayed over the entire inner diameter with a vinyl lacquer diluted with methylethylketone to a viscosity of elevent seconds as measured in a No. 4 Ford paint cup. The stack is pressed into the casing 13 and a mold in the shape of the ampule cavity 39 and the fill channel 34 is inserted. Additional molding compound 41 is forced through the access hole 42 in the top of the battery casing 13. The mold is removed from the ampule cavity 39 and the molding compound designated 43 is placed at the lower inner end of the cell stack in the position shown in FIG. 3, the ampule is inserted into the ampule cavity 39, and the breaker platform 16, together with the ampule support disk 21 and the stacked support 22 are put into place. The molding compound 44 between the stack support 22 and the casing 13 is now applied.

The entire unit is now pushed through a draw ring, the base member 15 is put into place, and the casing 13 trimmed and bent over the edge of the base member 15 to form the completed unit.

The glass ampule 18 filled with a suitable electrolyte, such for example, as fluoroboric acid, is held within the ampule cavity by friction between the friction contacts 19 and the ampule support disk 21. This friction is sufficient to maintain the ampule above the breaker platform 16, as shown in FIG. 3, during normal handling and shipping of the device. When the projectile 12 is fired, the set-back forces due to the forward acceleration are sufficient to move the ampule supporting disk 21 past the friction contacts 19, thereby allowing the ampule 18 to strike the impression 17 on the breaker platform with sufficient force to break the ampule.

After the projectile leaves the muzzle of the gun, the deceleration of the projectile allows the electrolyte to flow along the fill channel 34 and the spin of the projectile forces the electrolyte through the entry ports 32 into the cells to activate the battery.

Figure 5:
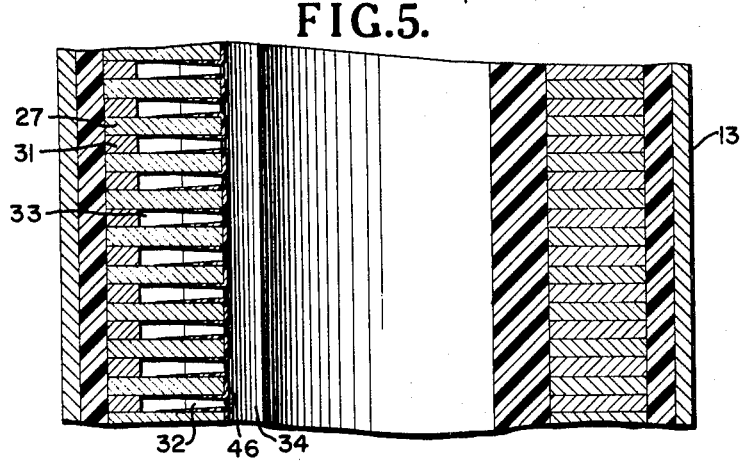
FIG. 5 is a partial detail view of FIG. 3 illustrating in greater detail a device embodying the present invention.

During the fractional part of a second required for the electrolyte to pass from the fill channel 34 into the individual cells by way of the entry ports 32, the series connected unit cells are subjected to a heavy short circuit through the flooding electrolyte. Upon completion of the cell filling and subsequent retraction of the electrolyte by the paper separators 31, some residual wetting of the electrode plate scallops 29 at the fill channel is apparent. Retention of the electrolyte at this edge results in the generation of voltage transients of sufficient magnitude to render the battery inoperable with respect to its end uses. To circumvent this tendency for short circuits to form, the interior of the stack has been sprayed with a vinyl lacquer 46 over the area forming the fill channel 34 and extending slightly within the cell channel 33 as best seen in greatly exaggerated form, FIG. 5. The vinyl lacquer forms over the cut edge of the scallops 29, an insulated area to prevent the shorting of the cells by reason of the residual wetting over the plate scallops at the fill channel and to increase the length of the circuit path through the electrolyte during the flooding period.

In addition to instituting the protection against electrolyte attack of sufficient duration to permit filling of the cell and clearing of the individual cell entry ports, this spraying operation supplies a part of the adhesive necessary in the bonding of the stack liner 45 to the inside of the cell stack and also waterproofs the corners of the paper separators 31 adjacent the entry port fill scallops so that the paper remains unwet at this critical point and thereby reduces the possibility of electrolyte communication by capillary action between the stack liner and the inner surfaces of the stack, a condition which ultimately leads to inner cell communication by the electrolyte with the generation of undesired voltage transients.

The quantity of vinyl lacquer required on plate scallops to afford protection against retained short circuits is slight. On the other hand, an excess amount of the vinyl lacquer sprayed indiscriminately on the inner surfaces of the stack may block the cell entry port 32 and prevent ingress of the electrolyte. A distinction is therefore made between a lacquer coating heavy enough to supply optimum adhesive properties for bonding the stack liner to the stack and the quantity required for electrode plate scallop edge protection.

There has been shown and described a battery or reserve energizer for a proximity fuze system or other electrical equipment contained within a projectile which provides a new and unique construction of the energizer cells to insure against generation of voltage transients of sufficient magnitude to render the battery ineffective with respect to its intended uses, during the fill period of the battery, and to insure against voltage transients by reason of residual wetting of the electrode plate scallops at the fill channel.

Obviously many modifications and variations of the present invention are possible in light of the above teachings. It is therefore to be understood, that within the scope of the appended claims, the invention may be practiced otherwise than as specifically described.

What is claimed is:

1. The method of constructing a force-filled battery for use as a power source in a spinning projectile comprising the steps of stacking the battery cells in such a manner as to interpose arcuate absorbent separators between annular plates forming said cells for providing an entry port for each cell along a fill channel, coating the exterior of the cell stack with a molding compound, spraying the cell stack entry port and the fill channel with an insulating lacquer, pressing the cell stack into a battery casing, lining the cell stack with molding compound in such a manner as to form an ampule cavity, bonding the stack liner to the inside of the cell stack with said insulating lacquer to prevent electrolyte communication by capillary action between said stack liner and the inner surfaces of said cell stack, inserting an electrolyte containing ampule and a support means therefor into the ampule cavity, and sealing the ampule cavity with a molding compound.

2. The method of claim 1 wherein the insulating lacquer is composed of vinyl base diluted with methyl ethyl ketone.

3. A reserve energizer for use as a power supply in a spin-type projectile comprising a breaker platform having an ampule support means thereon, a plurality of cells supported by said breaker platform, each of said cells comprising a pair of annular plates each having an inner annular edge, an ampule positioned within the annular opening of said annular plates and carried by said support means, a scallop along said edge, a paper separator disposed between said pair of plates and having a cell channel and an entry port therein, the scallops along said inner annular edge of said pair of plates being registered with the entry port in said paper separator, an insulating lacquer on said scallops, on the entry port of said paper separator and on said plate adjacent said scallop, a cylindrical stack liner surrounding said ampule and in sealing relation with the paper separators and the inner annular edge of said plates forming the inner surfaces of a cell stack; said liner having a longitudinal opening therein substantially coincident with said entry port of said paper separators; said lacquer extending radially inward past said scallops forming an adhesive bonding means between said stack liner and said inner surfaces of said stack for reducing electrolyte communication by capillary action between the stack liner and the inner surfaces of said stack whereby insulating lacquer prevents shorting of said cells when said cells are either being filled with electrolyte or by residual wetting of said plates along the scallops and entry ports thereof upon breakage of said ampule to release said electrolyte.

4. The energizer of claim 3 wherein said lacquer is composed of vinyl base diluted with methyl ethyl ketone to a viscosity of 11 seconds in a No. 4 Ford paint cup.

References Cited

UNITED STATES PATENTS

| | | | |
|---|---|---|---|
| 2,594,879 | 4/1952 | Davis | 136—14.2 X |
| 2,637,757 | 5/1953 | Wilke | 136—90 X |
| 2,740,821 | 4/1956 | Bone | 136—133 X |
| 2,889,389 | 6/1959 | Tamminen | 136—175 X |
| 2,927,145 | 3/1960 | Burrell | 136—90 |
| 2,918,514 | 12/1959 | Everett | 136—90 |
| 2,918,515 | 12/1959 | Lawson | 136—90 |
| 2,931,849 | 4/1960 | Burrell | 136—175 |
| 2,981,778 | 4/1961 | Freund | 136—90 |
| 2,985,702 | 5/1961 | Darland et al. | 136—90 |

FOREIGN PATENTS 1,091,667    5/1961    France.

BENJAMIN R. PADGETT, *Primary Examiner.*

MICHAEL J. McGREAL, *Assistant Examiner.*

U.S. Cl. X.R.

136—175